United States Patent [19]

Dodman

[11] Patent Number: 5,415,131
[45] Date of Patent: May 16, 1995

[54] PHEROMONE CONTAINING ANIMAL LITTER PREPARATIONS

[75] Inventor: Nicholas H. Dodman, Grafton, Mass.

[73] Assignee: Trustees of Tufts College, Medford, Mass.

[21] Appl. No.: 231,386

[22] Filed: Apr. 22, 1994

[51] Int. Cl.$^6$ .............................................. A01K 29/00
[52] U.S. Cl. ...................................... 119/171; 119/905
[58] Field of Search ............... 119/171, 172, 173, 905, 119/169, 711

[56] References Cited

U.S. PATENT DOCUMENTS

| | | | |
|---|---|---|---|
| 3,227,138 | 1/1966 | Campbell | 119/165 |
| 3,339,527 | 9/1967 | Burroughs | 119/169 |
| 3,626,899 | 12/1971 | Spellman | 119/169 |
| 3,752,121 | 8/1973 | Brazzell | 119/169 |
| 3,765,371 | 10/1973 | Fisher | 119/171 |
| 4,263,873 | 4/1981 | Christianson | 119/171 |
| 4,715,320 | 12/1987 | Barnhart | 119/169 |
| 4,800,677 | 1/1989 | Mack | 119/171 |
| 5,058,533 | 10/1991 | Nelson | 119/173 |
| 5,287,826 | 2/1994 | Mohamed | 119/168 |

FOREIGN PATENT DOCUMENTS

| | | | |
|---|---|---|---|
| 687719 | 2/1953 | United Kingdom | 119/171 |
| 878423 | 9/1961 | United Kingdom | 119/171 |

*Primary Examiner*—Gene Mancene
*Assistant Examiner*—Todd E. Manahan
*Attorney, Agent, or Firm*—David Prashker

[57] ABSTRACT

An improved animal litter preparation is provided for attracting a household domesticated animal and for absorbing liquids and liquid-containing waste released by the attracted animal. The litter preparation comprises a plurality of preformed and nontoxic liquid absorbing masses of solid matter each comprised of an absorbent substance, at least one releaser pheromone compound which is a biological attractant for the animal, and at least one blending agent.

6 Claims, No Drawings

PHEROMONE CONTAINING ANIMAL LITTER PREPARATIONS

FIELD OF THE INVENTION

The present invention is concerned with improvements in animal litters for containing and absorbing liquid-containing waste from domesticated animals; and is particularly directed to improved litter preparations employing pheromones as odorant attractions.

BACKGROUND OF THE INVENTION

One of the more commonplace items found in markets and homes today are animal litters which are sold for the purpose of receiving and absorbing (and/or adsorbing) urine and feces, liquid-containing animal waste, eliminated by household domestic animals; and particularly for small animals such as dogs, cats, mice, hamsters, and birds, that are typically kept in family homes or otherwise raised indoors in a household environment. Such litter materials are usually placed in containers termed "litter boxes"; and after a certain amount of time and usage by the animal has elapsed, the soiled litter material is disposed of and then replaced with clean litter material.

An enormous variety of different formulations, compositions, and substances have been used as litter materials. Initially, litters included the use of dried sand, newspapers cut up into small pieces, dry sawdust, dried grass, and the like. Other litters then came into use stemming from clay and other mineral formulations originally intended for use in business and industry for absorbing oil, grease, water, and other liquid spills. This class of formulations is exemplified by U.S. Pat. Nos. 2,665,259; 2,728,733; 3,278,040; 3,080,214; and 4,163,674. A third litter category are those formulations and processes directed to the making of animal litters specifically and which typically provide particular ingredients for the control, collection, and/or disposal of animal wastes. This litter category is exemplified by U.S. Patent Numbers 4,163,674; 4,278,047; 4,570,573; 4,671,209; 4,203,388; 5,109,805; 5,014,650; 5,193,489; 5,209,185; and 5,216,980.

As is well known and frequently complained of by owners of domesticated pets generally, a host of different problems are frequently encountered and are commonplace when using disposable animal litter formulations. Often, the household pet will outright reject the litter formulation; and such rejection is indicated by undesired droppings and waste messes anywhere in the household. In addition, the pet often tends to exhibit a preference for certain litter formulations; and once oriented or accustomed to using one litter formulation, the pet may reject another litter material, even if the substitute offers desirable additives or improvements. Finally, many pet owners regularly remix the litter material; removing some of the soiled material and adding new litter; and then mixing the old with the new as an economy measure. The difficulty lies in that the household pet often will dislike, if not outright reject, the remixed materials-thereby adding to the difficulty of controlling animal wastes.

It will be readily appreciated therefore, that a litter formulation which includes an odorant attractant, and serves as a stimulant for the olfactory organs of the animal, and draws the animal to using the litter would be seen as a major advance and improvement in such preparations. Equally important, if the olfactory organ stimulant and odorant attractant were perceived by the domesticated animal as being a lure, a marker, or a sexual incentive, the pet would become predisposed and quickly accustomed to using the litter material routinely and would find different formulations of litter materials equally appealing.

SUMMARY OF THE INVENTION

The present invention provides an improved animal litter preparation for attracting a domesticated animal and for absorbing liquid-containing waste released by an attracted domesticated animal, said litter preparation comprising:

a plurality of preformed and non-toxic, liquid absorbing masses of solid matter of determinable size and configuration, each of said masses of solid matter being an admixture comprised of
(a) a substance comprising at least one absorbent material which is non-toxic and absorbs liquids from liquid-containing waste released by a domestic animal;
(b) at least one pheromone compound which is an odorant attraction for a domesticated animal; and
(c) at least one blending agent which aids in the blending of said pheromone compound with said absorbent substance as an admixture.

DETAILED DESCRIPTION OF THE INVENTION

The invention is an improved animal litter preparation which provides a chemical stimulant and olfactory organ sensitive fragrance for household and domesticated animals; and which serves as a odorant attractant for the domesticated animal which entices and lures the animal into using the litter preparation as the site for the elimination of urine and feces. As such, the improved animal litter preparation provides multiple benefits and advantages. These include the following:

1. The improved animal litter preparation envisions and intends the use of all conventionally known formulations, methods of processing or manufacture; and particular or unique additives which are frequently found in commercially sold formulations. Accordingly, the present invention requires at least one substance which is an absorbent material able to absorb liquids and liquid-containing waste released by a domestic animal. The absorbent material may thus be entirely organic, entirely inorganic, or be any mixture of these. In addition, the materials may be amorphoric or particulate, crystalline or non-crystalline, homogeneous or heterogeneous, or any combination of these in admixture. Equally important, the absorbent material will typically be prepared as semi-liquid slurries of solid and liquid compositions-which after being properly formulated and combined in appropriate amounts and weights-will be molded, extruded, shaped, and frequently dried to yield shaped masses of solid material which are non-toxic and biocompatible for use with living animals.

2. The improved animal litter preparation comprising the present invention utilizes and employs in admixture at least one pheromone compound which is an odorant attraction for the household pet and serves to lure and entice the animal into using the improved litter preparation for release of liquid-containing waste. Among the pheromone compounds available and suitable for use are sex-attractants, territorial markers, trail markers, estrus associated scents, and other fragrances which stimulate the olfactory organs of the domesticated animal and which serve as a lure and enticement which appeals to or pleases the animal. Also, it is intended and envisioned that a blending of two or more different pheromones in varying concentrations will serve effectively as an odorous seductant into drawing the animal to using the litter preparation repeatedly.

3. The improved animal litter of the present invention permits the manufacturer to formulate the litter preparation into both "scoopable" and "non-scoopable" formats. Scoopable litter formulations typically are comprised of a clay based particulate which is mixed with a hydrophilic material, usually organic in nature. The hydrophilic material reacts with the water in the urine and fecal matter to coalesce and produce "clumps of sand" where the animal has urinated or defecated; and these formed clumps can be scooped from the litter box and disposed along with any solid feces. Alternatively, a non-scoopable litter formulation is one in which the shaped masses of solid material tend to break-up while absorbing the liquid-containing wastes released by the animals in these instances and embodiments, the present invention will continue to lure and entice the household pet to use the improved formulation repeatedly despite the break-up of the particulate material into granules which the animal would normally reject as unsuitable or undesirable.

4. The present invention utilizes a variety of blending agents which aid in the processing and manufacture of the litter preparation into a plurality of preformed and non-toxic, liquid absorbing masses of solid matter. These blending agents will aid and facilitate the intermixing of the ingredients for the specific formulation; and will allow the manufacturer to produce the desired masses of solid matter in the desired size and configuration. Thus, the shape and dimensions as well as the density, hydrophilicity, granularity and overall consistency may vary considerably from preparation to preparation and from formulation to formulation. In each instance, however, the use of at least one blending agent will serve to combine and mix the absorbent substance with the chosen pheromone in a manner and processing procedure which will yield the liquid absorbing masses of solid matter.

5. The present invention intends and foresees the use of a range of optional additives which may be employed or omitted as desired or required by the individual manufacturer. Thus, these optional additives will include pH indicator dyes, germicidal agents which are bactericidal or viricidual, coating agents, colorants, decay prevention agents and preservatives, and the like. The use or non-use of these optional additives will vary with the specific embodiment and chosen formulation.

In order to better describe and more clearly understand the features of the improved animal litter preparation which is the present invention, the detailed disclosure is given by different sections of information presented seriatim. These are: the constituent parts of the improved litter preparation; the attributes and characteristics of the fully formulated and prepared product; and several illustrative formulations which exemplify different embodiments of the improved animal litter preparation and serve as representations of the range and variety of different formulations available for use.

I. The Requisite and Optional Constituent Parts of the Improved Litter Preparation

A. THE ABSORBENT SUBSTANCE

The absorbent substance is a requisite component part of each formulation and comprises at least one absorbent material which is non-toxic to the animal and which is able to absorb liquid and liquid-containing waste released by the domestic animal. It is essential that at least one particulate or amorphous material be present for absorption of waste; however, it is preferred in most instances that a mixture of different particulate or amorphous materials be employed in combination and be prepared in accordance with conventional practices and manufacturing techniques presently known in this field. It is also desirable that the absorbent material, regardless of specific formulation or source or chemical composition, be hydrophilic and thus effectively be able to absorb and/or adsorb the urine and liquid-containing feces eliminated by the animal as waste. It is also very desirable that the absorbent substance or substances in combination be non-toxic-that is biocompatible with the living animal; that the material provide a density of solid matter which is comfortable for use by the household animal; and that the overall preparation in most preferred instances provide both an organic fiber and inorganic filler combination as a prepared formulation.

Merely as an aid to the user, representative listings of compositions suitable for use as the absorbent substance are given below. A listing of organic materials, particularly plant or vegetable matter, is provided in Table 1. Alternatively, a representative listing of inorganic materials including natural or synthetic clays and minerals are provided in Table 2. In addition, recognizing that many formulations employ one or more polymeric materials as a constituent part of such formulations, a representative listing of polymers is provided in Table 3.

TABLE 1

| ORGANIC MATERIALS |
| --- |
| Plant (Vegetable) Matter |
| cotton |
| linen |
| waste paper and paper sludge |
| wood chips and wood dust |
| peat moss and other mosses |
| alfalfa and other leafy plants |
| cellulose and cellulosic derivatives |
| water-soluble polysaccharides |
| sugar cane; sugar-beet pulp; citrus pulp |
| grains (such as rice, rye, corn) |
| vegetable gums |
| soil |

TABLE 2

| INORGANIC MATERIALS |
| --- |
| Natural or Synthetic Clays |
| montmorillonite |
| attapulgite |
| bentonite |
| Porter's Creek clay |
| Fuller's Earth |
| kaolinite |
| halloysite |
| fly ash |
| palygorskite |

TABLE 2-continued
INORGANIC MATERIALS sepiolite
Minerals
limestone [CaCO3]
dolomite [CaMg(CO3)2]
gypsum; plaster of Paris
Portland cement
pumice
sand; sodium silicates
vermiculite
perlite
calcium silicates
opalite
mica
talc
finely divided quartz
zeolite
activated carbon

TABLE 3
POLYMERIC MATERIALS polyurethane foams
polyvinyl alcohol
polystyrenes
phenolic resins
polyvinylpyrrolidores In general, it is preferred that free-flowing materials be employed as the absorbent substance. The materials may take physical form in any shape, in any size, in any sieve diameter, and in any shape or configuration. The materials may also be regular or irregular; particulate or amorphous; crystalline or non-crystalline; homogenous or heterogeneous; pure or partially-pure or impure; and may or may not be of established chemical formulation as such. When using organic materials, it is very desirable that a pulp or granular hydrophilic medium formed of cellulose or a cellulose derivative be employed. Alternatively, when using inorganic matter, a highdensity, bulk filler is preferred, which may be employed alone or in combination with conventionally known particle forming agents. In preferred embodiments of the improved animal litter preparation comprising the present invention, combinations and specific formulations of organic and inorganic matter will be employed in varying ratios, in differing amounts, and in diverse concentrations. All of these variations are deemed to be within the scope of the present invention.

B. AT LEAST ONE PHEROMONE

Pheromones are chemical substances as used for communication between is individual members of the same species; and which act as intraspecific chemical messengers perceived primarily by the olfactory sense and to a lesser extent, the gustatory sense of the living animal. Evidence of pheromones and pheromone communication has been investigated and reported since the late 1950's [Karlson and Luscher, *Naturwiss* 46:63 (1959) and *Nature* 183:55 (1959); Karlson and Butenandt, *Annu. Rev. Entomol.* 4:39 (1959)].

Pheromone communication has been found to occur in mammals including some primates; in reptiles, amphibians, fish, earthworms, fungi and molds; and is especially prevalent in insects. Pheromones, by definition and effect, are found in two broad categories, the "releasers" and the "primers"-which are differentiated by the kinds of in-vivo response they elicit. Releasers generally have an immediately perceived, direct, and reversible effect on social or sexual behavior for the species; thus releasers typically include alarm pheromones, trail and territorial markers, sex attractants, and aphrodisiacs. Alternatively and in contradistinction, the primer category of pheromones are less well known; and bring about long-term physiological changes in the target species or population. One example of a primer pheromone is the "queen substance" of the honeybee which inhibits ovarian development in workers after mating and thereby prevents the appearance of new queen bees. Overall reviews of these categories and of specific pheromones are provided by the following publications, the text of which is each individually incorporated by reference herein: MacConnell and Silverstein, *Chemistry* 44:6-9 (1971); Jacobson, M., *Insect Sex Pheromones* (Academic Press, New York, 1972); Brown et al., *Bio Science* 20:21 (1970); Greer *et al., Amp. J. Vet. Res.* 27:773-781 (1966); Goodwin *et al., Science* 203:559-561 (1979); Schneider, D., *Science* 163:1031-1037 (1969); Silverstein et al., *Science* 159:889-890 (1968); Thiessen *et al., Science* 160:432-434 (1968); Moulton, D.G., *Science* 162:1178-1180 (1968); Mykytowycz, R., *Scienct. Am.* 218:116-126 (1968); Tonosaki, K. and D. Tucker, *Comp. Biochem. Physiol.* 81A:7-13 (1985); Tonosaki, K. and D. Tucker, *Behav. Neuro. Biol.* 35:187-199 (1982)].

The present invention therefore employs at least one pheromone which is a "releaser" and is either a sex attractant, a trial marker, a territorial marker, or an aphrodisiac for the animal. Generally undesirable and unsuitable is that sub-class of releaser which is an "alarm pheromone"-a compound causes distress, arousal, or aggression when introduced to the olfactory nerve of the animal. A preferred listing of releaser pheromones suitable for use is provided by Table 4 below. It will be appreciated that this listing is merely a representative presentation and exemplification of those pheromones deemed most desirable under household use circumstances.

It will be recognized and appreciated also that the type and chemical composition of the pheromone chosen for use will vary in some degree with the species of animal whose liquid-containing waste is to be absorbed. Thus, the improved litter preparations for dogs and cats will employ one or more chosen pheromones which may differ from those deemed most suitable for use with hamsters, gerbils, mice and rats; and which will vary markedly, if not radically, from the pheromone chosen for use with birds and fowl generally. The representative listing provided by Table 4 below thus lists the choices deemed most suitable for use with domesticated cats and dogs; thus, other pheromones, which are well recognized and established in the reported literature as such, may be more suitable for use with other species of mammals and birds generally.

TABLE 4

Preferred Pheromones aliphatic n-acetates such as n-pentyl acetate;
aliphatic n-fatty acids such as n-butyric acid;
alkyl hydroxybenzoates such as methyl p-hydroxybenzoate and ethyl p-hydroxybenzoate;
substituted phenols such as 2, 6-dichlorophenol;
benzoic acid derivatives such as p-hydroxybenzoic acid and 4-hydroxy-3-n-ethoxybenzaldehyde;
salicylates such as methyl salicylate; linoleic acid; and
sex hormones such as naturally occurring and synthetic androgens and estrogens, their analogs, homologs, and

TABLE 4-continued

Preferred Pheromones derivatives generally.

*Tonosaki, K. and D. Tucker, Comp. Biochem. Physiol. 81A:7-13 (1985); Goodwin et al., Science 203:559-561 (1978); and Sonenshine et al. Exp. Appl. Acarol. 1:23-24 (1985).

In general, the pheromone chosen for use will be employed at a concentration ranging from about 0.1 part per million to about 50,000 parts per million; or alternatively as 0.0001% to about 5.0% (either weight:-weight or volume:volume). This broad range of varying concentration is purposefully provided in order to accommodate the various properties and attributes of the absorbent substances chosen for use in that specific embodiment of the litter preparation. Thus, if clays are employed, it is deemed that a generally greater concentration of 0.01-5.0% be employed because of the general properties of clays as odor neutralizing compositions. Alternatively, if inorganic minerals are employed which are crystalline in nature, or if cellulose based organic vegetable pulp such as paper pulp or paper sludge is employed, lesser concentrations ranging fromo 0.001% to about 0.1% are generally suitable. Nevertheless, the entire concentration range of from 0.0001-5.0% is recognized as both suitable and convenient for use when preparing the improved animal litter preparation of the present invention. It is deemed a matter of personal choice or convenience to the user or manufacturer to decide which specific pheromone to employ and in what specific concentration the chosen pheromone will be used.

C. A BLENDING AGENT

The third and final component part of each improved animal litter preparation comprising the present invention is the use of an aqueous blending agent. The purpose and function of the blending agent is to facilitate and aid in the combining and dispersion of the chosen pheromone with the absorbent substance as an admixture. In general, the aqueous blending agent will comprise from 1-10 percent of the final composition (either weight:weight or volume:volume); however, the concentration and quantity of the selected aqueous blending agent will be minimal in order that it play its role without seriously affecting or modifying the other component parts of the litter preparation.

The most common blending agent for general use is water and aqueous salt solutions including buffers as such. In addition and as alternatives, it is often desirable that a variety of surfactants which reduce the surface tension and permit a better intermixing of aqueous and non-aqueous component parts to be achieved. A representative listing of preferred aqueous blending agents is therefore provided by Table 5 below.

TABLE 5

AQUEOUS BLENDING AGENTS

Water and aqueous salt solutions;
soap (sodium sterate);
cationic surfactants;
anionic surfactants;
non-ionic surfactants;
starches and alginates;
vegetable based gums (including gum acasia,
xanthuen gum, guar gum, and galactonannon gums); and
oletin waxes and paraffins The blending agent is also chosen with regard to the particular processing steps or mode of manufacture chosen by the user. Recognizing that the conventional knowledge provides a variety of different processing procedures including the making of slurries; a range of different molding, extrusion, freeze-drying, heat-evaporating, and other manufacturing processes using a host of entirely different equipment and methods, the choice of blending agent is clearly dictated by the mode and means of manufacture. A variety of different patented processes are available for making and manufacturing the prepared formulation and yielding masses of solid matter of determinable size and configuration which are suitable and desirable for use as the improved animal litter preparation. All of these blending agents, whether expressly listed by Table 5 or not, are therefore deemed to be within the scope of the present invention.

D. OPTIONAL ADDITIVES

The improved animal litter preparation which is the present invention permits the user to optionally include a variety of other ingredients as additives which are not essential-but may in various instances be desirable for that embodiment and intended use circumstance. All of these additives are entirely optional; all of these additives are conventionally known and frequently employed in both a personal and commercial manufacture; and all of these provide properties which, under specific use circumstances, offer added benefits and advantages for that particular situation and that particular animal species.

A representative listing of optional additives is provided by Table 6 below. These additives, if employed, are generally present in small percentage quantities, typically 0.01-1.0 percent; and do not meaningfully influence or affect the admixture of essential component ingredients. Accordingly, the presence or absence of these optional additives is clearly a matter of personal choice; and any and all additives employed for this purpose within the preparations described herein are deemed to be within the scope of the present invention.

TABLE 6

OPTIONAL ADDITIVES

Food additives such as ferrous sulphate;
colorants and color-generating dyes;
germicides including bacteriocidal and bacteriostatic
compounds, fungicidal and fungistatic compounds, and
anti-parasitic compositions;
prevention of decay and preservative compositions such
as anti-oxidants;
adhesion improvers and coatings such as zeolite; and
pH indicator dyes.

II. The Manufactured Animal Litter Preparation.

The outcome and result of combining an absorbent substance with at least one pheromone and at least one blending agent will yield a preformed and non-toxic product which typically exists as shaped masses of solid matter of determinable size and configuration. Each shaped mass of solid material is itself an embodiment of the prepared admixture preparation; is itself an example and an embodiment of a shaped mass of solid matter whose density, configuration, and actual dimensions will vary radically from formulation to formulation; and is a non-toxic, biocompatible product which is hydrophilic in nature and is able to absorb urine and other liquid-containing waste released by the household pet or domestic animal.

The overall size, configuration, and density of the masses of solid matter which comprise the improved litter preparation will vary with the formulation and the method of processing. Thus, the final product may appear to the unaided eye as a clump or irregular mass; as a granular particulate; as an almost amorphous lump; or as a geometrically regular article of manufacture. Clearly, products whose manufacture includes extrusion will typically appear as granular particles, beads, or short elongated rods. Conversely, those manufacturing processes which include heat-evaporation methods of drying will yield sheets of brittle material which will crumble in the hand and will result in an irregularly-shaped gravel. In these embodiments, the product is generally very dry in composition, granular in feel, and rough in appearance.

In the alternative, several semi-fluid preparations and formulations employing clays, minerals and sand, (as well as organic cellulose pulp material) will provide a viscous product which is granular and clay-like in texture and appearance. This alternative style of formulation and embodiment is highly absorbent of liquid and feces but appears as a soft, pliable, amorphous and malleable material of high bulk density. Often, this putty-like product can be spread with a knife as a layer; and this putty-like appearance provides a uniform surface coating of several centimeters or inches thickness in the litter box itself.

All of these prepared improved litter preparations have the essential and requisite pheromone characteristic and attribute: a fragrance and scent which lures and entices the domesticated animal; and persuades the animal to urinate and defecate on the improved litter preparation rather than anywhere else in the household. The alluring fragrance is an odorant and persuasive attraction for the animal; and the single pheromone or the combination of different pheromones will draw the animal to the litter preparation repeatedly and over long durations of use despite the ever increasing amounts of liquid and liquid-containing waste previously deposited thereon III. Illustrative Embodiments and Representative Examples.

It is deemed useful to provide some illustrative examples of the present invention which utilize and employ conventional formulations of animal litters previously known in this field. Each illustrative example is a substantive modification and alteration of the original, conventionally known formulation due to the use and presence of at least one pheromone within the overall preparation. It will be recognized and understood also that these embodiments are provided herein merely as illustrations of the many different formulations and compositions which may be usefully employed with pheromones to provide animal attracting litter preparations. None of the examples described hereinafter restrict or limit the scope of the present invention; to the contrary, all of the embodiments to be disclosed below are merely representative of the broad range and variety of different formulations envisioned and foreseen by the present invention.

Example 1: A First Formulation:

A first example of an improved animal litter preparation is made using 50-100 ppm of n-pentyl acetate as the chosen pheromone; and is a substantive alteration and modification of the composition and processing revealed by U.S. Pat. No. 5,210,980. The n-pentyl acetate is combined with a particulate base which may comprise a variety of materials from sand to sawdust to wood shavings to clay particles. Mixed with the particulate matter is an additive composition which consists of a quantity of gluten based media, along with sodium bicarbonate or baking soda and ground or shredded corn cob pieces.

Preferably, the gluten based medium comprises a wheat derivative. Although flours of such grains provide desirable hydrophilic and adhesive or hydrating properties, they do not readily mix with the litter particulate; specifically, they tend to settle. Preferably, the gluten based media and the n-pentyl acetate should remain in suspension.

Accordingly, gluten based materials with a larger particulate size and granular consistency are desired. Particularly preferred media exhibit a consistency are desired. Particularly preferred media exhibit a consistency that permits ready mixing with the granular clay particulate and also provides an aesthetically pleasing coloration, such as purified middlings of hard wheat.

One particular granulation of durum wheat, commonly used to make pasta, is sold under the common name of semolina. Semolina is more grainy than various wheat flours and thus tends to remain in suspension with a clay particulate litter base. By maintaining a homogeneous suspension of the gluten based media closer to the exposed surface of a relatively liquid impermeable base particulate, a faster acting hydration or coalescence is achieved with the waste matter. This action also prevents liquid from seeping through to the bottom of the container where clumping and/or hardening to the container bottom can create difficulties during periodic cleanings of the litter.

Appreciating the need to maintain the suspension of the granular, gluten based medium, such as semolina, within the base particulate, relative concentration ratios in the range of 1 to 6 pads of a clay particulate to the semolina provide the desired results. A 1:2 ratio provides a fast clumping action, although a 1:6 ratio reduces the cost per mixing.

A quantity of sodium bicarbonate or baking soda is also added to the mixture to activate the clumping action. A relative mixture range of this material to the purified semolina might comprise 1-5% bicarbonate to semolina. Settling of the bicarbonate is partially prevented by the fine grained semolina.

Finally, the mixture desirably includes a quantity of ground corn cob pieces in a concentration range of 1-5% corn cob to semolina. The composition mixture of nbutyric acid, semolina, sodium bicarbonate and impregnated corn cob can be used as an additive with a clay particulate litter base. Alternatively, the composition can be added to other non-scoopable, commercially available litters.

Example 2: A Second Formulation:

A second example of an improved animal litter preparation employs 50-100 ppm p-hydroxybenzoic acid as the pheromone and is a substantive modification of the compositions and processing described by U.S. Pat. No. 5,193,489. This phydroxybenzoic acid is combined with a particulate earth substance in admixture with a water soluble or dispersible polysaccharide selected from the galactomannan gums, the polysaccharide being present in an amount sufficient to increase the inherent clumping ability of the earth. By a galactomannan is understood a polysaccharide mainly or wholly consisting of mannose and galactose, and preferably comprising a chain of mannose units bearing galactose side-chains.

The galactomannans may be selected to be effective at relatively low concentrations and to give a fast clumping response. While this property might be regarded as unimportant it does, in fact, contribute to the economy of the litter in use since it assist in confining the urine to a relatively compact volume of the litter.

Vegetable based gums are usually marketed in a number of grades ranging from the relatively impure base gum, through purified gums from which some extraneous vegetable matter has been removed to derivatised gums which have been treated chemically to alter their characteristics in some way. While the base non-purified gums give good gelling performance it has been found that they yield clumps which are either not fully hard or take a relatively lengthy period of time to produce a hard clump. They may be used, but are not preferred.

The gums used according to this invention are preferably relatively purified and may be derivatised, e.g. by reaction with propylene oxide to form the hydroxy propyl ether, to augment their hydrophilic character. Purified gums derivatised to augment their hydrophilic character are particularly effective according to the invention. It is also preferred to use a gum which has been treated to reduce their alkalinity in aqueous dispersion or solution e.g. by the inclusion therein of a relatively weak organic or inorganic acid, for example, one having a pK value in aqueous solution of at least 4.0.

Preferably the galactomannan gum selected is a guar gum or derivative thereof. This galactomannan gum, when used in dry, particulate form may contain a restricted quantity of water which is preferably present in less than 20% by weight and/or in a quantity which does not impair the flowability or handling qualities of the material.

The concentrations of cellulose ethers specifically disclosed to be effective range from 0.3% upwards. The galactomannans used give effective clumping at concentrations down to 0.05% by weight of the earth (dry weight) or below in certain instances and are preferably used in from 0.02% to 1% by weight although any larger quantities, for example up to 2.5% or more by weight, may be used without departing from the scope of the invention.

To prepare the litter, particles of the earth are preferably mixed with the phydroxybenzoic particles of the polysaccharide. The earth is suitably a relatively poorly clumping material, for example a Southeast US Fullers earth (calcium magnesium montmorillonite) other impure montmorillonite or other smectite or attapulgite. The earth preferably has a particular size mainly, for example of at least 95% by weight, in the range of about 10 to 140 mesh, preferably about 18 to 100 mesh USS. The polysaccharide preferably has a similar size range. The polysaccharide gums and phydroxybenzoic acid do not segregate unduly from the earth. The presence of the polysaccharide in particulate form appears to encourage swift dissolution or dispersion in liquid, in comparison with gum which might have been deposited onto the earth particles from solution, and therefore to encourage a quick clumping response. Mixing of the p-hydroxybenzoic acid, the earth and the polysaccharide may be accomplished by any mixing device which is suitable for blending particulate solids without appreciably abrading them or otherwise causing an undue reduction in particle size, for example a double cone or V-shaped rotating tumble blender in a batch wise operation or cascaded variable speed screw devices feeding an internally mixed blend/product hopper in a continuous mode.

Example 3: Other Use Formulations:

(A) Pheromone and Clay Absorbents

These may be manufactured by the process disclosed in U.S. Pat. No. 4,657,881 according to which the chosen pheromone in concentrations from about 0.1–50,000 ppm are combined with particles of a clay mineral containing some but not more than 15% by weight of water, and possibly containing additives, are compacted on a roller or static press into compacted masses which are broken down into the required litter particle size. The clays may be selected, for example from smectites, attapulgite and sepiolite and may be very suitably be an alkali metal or alkaline earth metal montmorillonite available from Laporte Industries Limited under the Trade Name Surrey Powder.

Alternatively the clay may be for example a kaolinite, an attapulgite, a sepiolite or a montmorillonite, which has been screened to a suitable particle size, or agglomerated possibly with the addition of a binder without the use of high pressure. Such clays may have a lower moisture content to may have been calcined.

(B) Pheromone and Gypsum-based Absorbents

Gypsum (calcium sulphate dihydrate) forms the basis for a range of litter products. The raw gypsum is combined with the chosen pheromone at 0.1–50,000 ppm concentrations as a paste; and then is heated to form calcium sulphate hemi-hydrate which may alternatively be utilized as the preformed product "plaster." The hemihydrate is mixed with a controlled quantity of water to from a settable paste which, after setting and drying, is crushed and screened to the desired litter particle size. Such a process is described in U.S. Pat. No. 4,163,674.

(C) Pheromone and Cellulose-based Absorbents

There are many paper-based absorbents available for use as a litter based in combination with pheromones. Particularly, European Patent Specification Nos. 115898 and 169946 describe processes for the production of such a base by taking waste sludge from a paper mill having a content of cellulosic fibres of about 20% to 50% together with fillers, which sludge is dewatered to a semi-dry mass, granulated and dried.

(D) Pheromones and Calcium Silicate-based Absorbents

Such absorbents may be manufactured by the process described in, for example, United Kingdom Patent Specification No. 2039707 according to which a silicon dioxide such as quartz powder is reacted in an aqueous medium with a chonln pheromone (0.1–50,000 ppm) and with calcium oxide, and the product is molded or shaped, autoclaved, comminuted, dried and graded.

(E) Pheromones and Polymeric Absorbents

A wide range of polymeric absorbents are known; and many based on acrylate copolymers containing acid-functional groups cross-linked by the use of, for example vinyl polymers are suitable for combination with a pheromone at 0.1–50,000 ppm concentrations. One such range of polymeric absorbents suitable for litter use may be produced by the process disclosed in U.S. Pat. No. 4,342,858.

The present invention is not to be restricted in form nor limited in scope except by the claims appended hereto.

What I claim is:

1. An improved animal litter preparation for biologically attracting substantially all members of domesticated animal species and for absorbing liquid-containing waste released by a biologically attracted member of the domesticated animal species, said animal litter comprising:

a plurality of preformed and non-toxic, liquid absorbing masses of solid matter of determinable size and configuration, each of said shaped masses of solid matter being an admixture comprised of (a) a substance comprising at least one absorbent material which is non-toxic and absorbs liquids from liquid-containing waste released by a biologically attracted domestic animal;

(b) at least one releaser pheromone compound which is a biological attractant for substantially all members of the domesticated animal species, said releaser pheromone compound having an immediately perceived, direct and reversible biological effect upon the behavior of the species' members and being a compound selected from the group consisting of biological sex attractants, biological trail markers, biological territorial markers, and biological aphrodisiacs for the species' members; and (c) at least one blending agent which aids in the blending of said releaser pheromone compound with said absorbent substance as an admixture.

2. The improved animal litter preparation as recited in claim 1 wherein said absorbent substance comprises an organic composition.

3. The improved animal litter preparation as recited in claim 1 wherein said absorbent substance comprises a polymeric material.

4. The improved animal litter preparation as recited in claim 1 wherein said absorbant substance comprises an inorganic material.

5. The improved animal litter preparation as recited in claim 1 wherein said releaser pheromone compound is a biological attractant selected from the group consisting of aliphatic n-acetates, aliphatic n-fatty acids, alkyl hydroxybenzoates, substituted phenyls, benzoic acid derivatives, and sex hormones.

6. The improved animal litter preparation as recited in claim 1 wherein said blending agent comprises at least one surfactant selected from the group consisting of cationic, anionic, and non-ionic surfactants.

* * * * *